United States Patent [19]
Cornelius et al.

[11] Patent Number: 5,442,167
[45] Date of Patent: Aug. 15, 1995

[54] METHOD AND APPARATUS FOR AUTOMATIC IMAGE FOCUSING

[75] Inventors: Craig J. Cornelius, Woodinville; Kevork Arackellian, Everett, both of Wash.

[73] Assignee: Intermec Corporation

[21] Appl. No.: 48,825

[22] Filed: Apr. 16, 1993

[51] Int. Cl.⁶ ............................................. G01J 1/20
[52] U.S. Cl. .................... 250/201.2; 250/566
[58] Field of Search ................ 250/201.2, 201.7, 566, 250/568; 235/462, 469, 467, 472; 358/227

[56] References Cited

U.S. PATENT DOCUMENTS

| | | | |
|---|---|---|---|
| 3,769,890 | 11/1973 | Alasia | 95/18 |
| 3,857,031 | 12/1974 | Sinclair et al. | 250/201 |
| 4,558,367 | 12/1985 | Urata et al. | 358/227 |
| 4,563,705 | 1/1986 | Oinoue et al. | 358/227 |
| 4,570,185 | 2/1986 | Arai et al. | 358/227 |
| 4,587,466 | 5/1986 | Berg et al. | 318/38 |
| 4,798,947 | 1/1989 | Baxter | 250/201 |
| 4,846,155 | 7/1989 | Kimura | 128/6 |
| 4,924,317 | 5/1990 | Hirao et al. | 358/227 |
| 5,101,278 | 3/1992 | Itsumi et al. | 358/227 |
| 5,115,262 | 5/1992 | Komiya | 354/402 |
| 5,245,172 | 9/1993 | Esslinger et al. | 250/201.2 |

FOREIGN PATENT DOCUMENTS

| | | | |
|---|---|---|---|
| 533590A2 | 9/1992 | European Pat. Off. | G01C 3/08 |
| 3243920A1 | 11/1982 | Germany | H04N 1/028 |
| 63175844 | 1/1987 | Japan | G03B 27/34 |

*Primary Examiner*—Stephone B. Allen
*Attorney, Agent, or Firm*—L. David Rish; Edmund W. Rusche

[57] ABSTRACT

An apparatus and method is presented wherein the lens system or assembly is fixed in its location along an optical axis between an object and its image. The focusing of the object, which may vary its position along the optical axis, occurs through adjusting a detection medium or an imager to the position in image space where the image space is focused on its image plane. The invention is structured to facilitate this focusing in an automatic and very rapid manner to accommodate rapid changes in the location of the object along the optical axis.

60 Claims, 5 Drawing Sheets

METHOD AND APPARATUS FOR AUTOMATIC IMAGE FOCUSING

FIELD OF THE INVENTION

The present invention relates to rapid image focusing of objects located in object planes which frequently change their distance from the focusing apparatus. An example occurs with an apparatus for sequentially focusing images of an objects located on the surface of a series of articles of different heights being transported along a predetermined path such as on a conveyor belt.

BACKGROUND OF THE INVENTION

Many optical scanning applications where target distances can change rapidly require fast, accurate and automatic focusing systems. For example, a package scanning system, such as one used for reading postal bar code labels from surfaces of boxes or packages on a moving conveyor, must necessarily be capable of reading labels from boxes of all sizes. Since such system is based on an optical configuration which must quickly adapt to reading the bar code labels that are located at differing heights above the conveyor, a highly responsive optical reading system is required.

Typically, optical systems which must be capable of automatic focusing over a predetermined range of object distances utilize lens element separation changes to accomplish the required imaging on a fixed image plane. Electrical range detectors and controlling systems for operating the mechanical adjustments are part of the systems. In the world of commercial photography, automatic focusing cameras allow for focusing by the movement of the lens assemblies in relation to the location of a fixed image plane where the film would be located. Such mechanically adjustable lenses are bulky, having a high mass which drastically slows the response time of the focusing adjustment. While acceptable in the fields they were designed for, such systems are undesirable in modern needs for high speed detection and electronic reading capability for scanned optical information.

It is an object of this invention to present an apparatus and method which provides rapid focusing of an object onto an image plane.

It is a further object of this invention to present an apparatus and method that rapidly and automatically focuses images of objects located in object planes with sequential and rapid varying distances from the lens or receiving optics of the apparatus.

A further object of the invention is to provide an apparatus and method where the rapid automatic focusing of the optical receiving system occurs by moving the image plane in respect to the fixed optics or lens system.

Another object of the invention is to provide rapid focusing for objects located at differing distances from the lens of the viewing apparatus through the use of an automatic and rapid imager position adjustment relative to the image plane wherein the image of the object will be focused by the lens.

SUMMARY OF THE INVENTION

The invention is an apparatus and method wherein the lens system or assembly is fixed in its location along an optical axis between the object and the image. The focusing of an object, which may vary its position along the optical axis, occurs through adjusting a detection medium or an imager to the position in image space where the image is focused in its image plane. The invention is structured to facilitate this focusing in an automatic and very rapid manner to accommodate rapid changes in the location of the object along the optical axis.

Simply expressed, the apparatus comprises a first member that is held in a fixed position relative to the optical axis, a second member adapted to hold the imager and moveable relative to the first member, and an actuator attached to the second member to move the second member relative to the first member in response to a predetermined drive signal to position the imager at the image plane wherein the image is in focus.

According to another perspective, the invention is a method for rapidly forming a focused optical image of an object on an imager. The image is focused in an image plane that intersects an optical axis. The method comprises the steps of (a) placing a first member supporting a stationary optical element at a fixed position along the optical axis, (b) providing a moveable second member holding the imager, (c) generating a drive signal indicative of the distance along the optical axis between the focus of the image and the location of the stationary optical element, and (d) selectively moving the second member relative to the first member in response to a drive signal to position the imager at the image plane. In generating the drive signal of element (c), one may either use information of the distance of the object from the stationary optical element or information based upon the contrast or sharpness (i.e., quality) of the image.

The invention presents a system which comprises a means for detecting the location of the object along the optical axis or the quality of the image and feeding this information to a controller which determines the proper location for setting the imager at the image plane where the image will be in focus. The controller emits a drive signal to an actuator which forces the imager to this image plane allowing detection of the optical information from the object.

DETAILED DESCRIPTION OF THE PREFERRED EMBODIMENT

In this invention focusing of the image of an object is accomplished by moving the detector (CCD imager, film, etc.) to the image plane instead of moving the optical elements within a lens assembly or the lens assembly itself. This approach is desirable because the mass of the moving element can be significantly reduced resulting in faster focusing for a given amount of power. Further, when a lens group within a lens system is moved, one must also consider the effects of aberrations caused by tilt and axial decentering of the moving elements on the modulation transfer function of the system.

The motion of the image plane can be pure linear motion along the optical axis, or it can move along an arc tangential to the optical axis and having a radius large in comparison to the amount of movement required in a direction along the optical axis. This results in a small angular motion of the imager. However, depending on the magnitude of the radius of the arc, which is set tangential to the optical axis, linear motion in a direction along the optical axis can well be approximated. Also to be considered for radial movement of the imager is that the center point of the imager, defined as being the location on the imager of the optical axis when the imager's image plane is perpendicular to the optical axis, will move off the optical axis slightly as the imager is moved along an arc. This can cause some distortion in the received image by the imager which will need consideration in view of the particular application requirements.

Either form of motion is applicable with one or two dimensional imagers with the caveat of possible distortion problems mentioned above regarding movement along an arc. The requirements utilized in these preferred embodiments were not adversely affected by such movement. Clearly, this potential problem is a matter of degree and can be designed around within the present state of art in the field.

In practical applications the inventor has obtained successful results with a total range of movement of the imager along the optical axis of 0.012 inches or less. It will be clear from the following descriptions that values for ranges of imager movement can be larger or much smaller than the above range by proper design of the optical system, including control for the location of the fixed lens in relation to the object ranges to be expected.

On the simplest scale the mechanism may be composed of two pieces, one being a moving frame containing an imager and the other being a stationery frame containing the lens or lens assembly. For rapid focusing of the optical image on an imager, an actuator is attached to the moving frame to move it relative to the stationary frame. The actuator responds to a drive signal from a controller for positioning the imager at the imaging plane.

Figure 1:
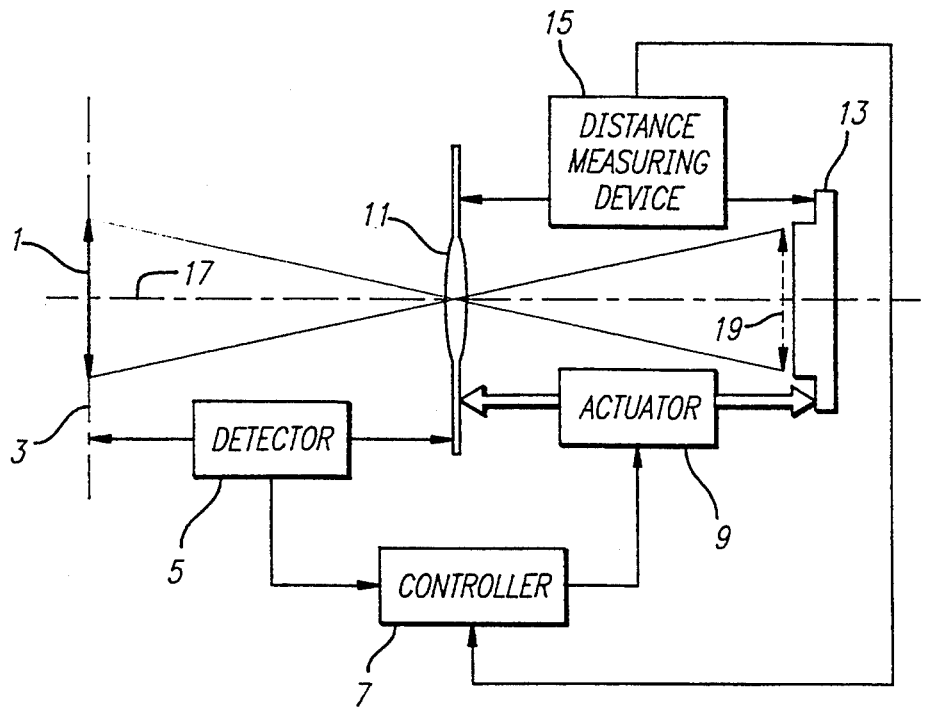
FIG. 1 is a schematic showing the general layout for the invention where an actuator creates linear motion for the imager along the optical axis.

In FIG. 1, an object 1 is positioned in an object plane 3 along optical axis 17. This object is considered capable of changing its position along optical axis 17 in relation to lens assembly 11 which is also mounted on the optical axis at a fixed location. A detecting device or imager 13 is movably positioned along optical axis 17 to detect an image 19 focused at its image plane and occurring from object 1.

Imager 13 may be a one or two dimensional CCD array, a transistorized two dimensional array image receiver, or a simple chemical film system. It is clear to one skilled in the art that imager 13 could be any of a multitude of devises well-known in the prior art.

As object 1 moves to different locations along optical axis 17 the automated system comprises a detector 5 for determining and measuring the distance of the object 1 from lens 11, an actuator 9 connected in relation to lens 11 to position imager 13 at the image plane for image 19. A controller 7 is connected to receive data from detector 5 for determining the amount of control needed to be applied to actuator 9 for relocating imager 13 to any new image plane wherein the image is to be focused as caused by a change in the location of object 1.

Although not generally needed, a distance measuring device 15 can be connected between lens 11 and imager 13 to monitor the location of imager 13 in relation to lens 11, and to feed this information to controller 7 thereby providing a control feedback loop to actuator 9. By this means, in addition to providing location data on imager 13, device 15 can provide continuous feedback signals to controller 7 for maintaining imager at the image plane. In addition, it may be necessary to ensure that sufficient resistance to movement is built into imager 13 to provide ample stability to its position during periods when controller 7 is not directing a move through actuator 9.

In one embodiment of the invention, distance measuring device 15 comprises a linear variable differential transformer (LVDT). Other systems of precise linear distance measurement are well known in the prior art.

Figure 2:
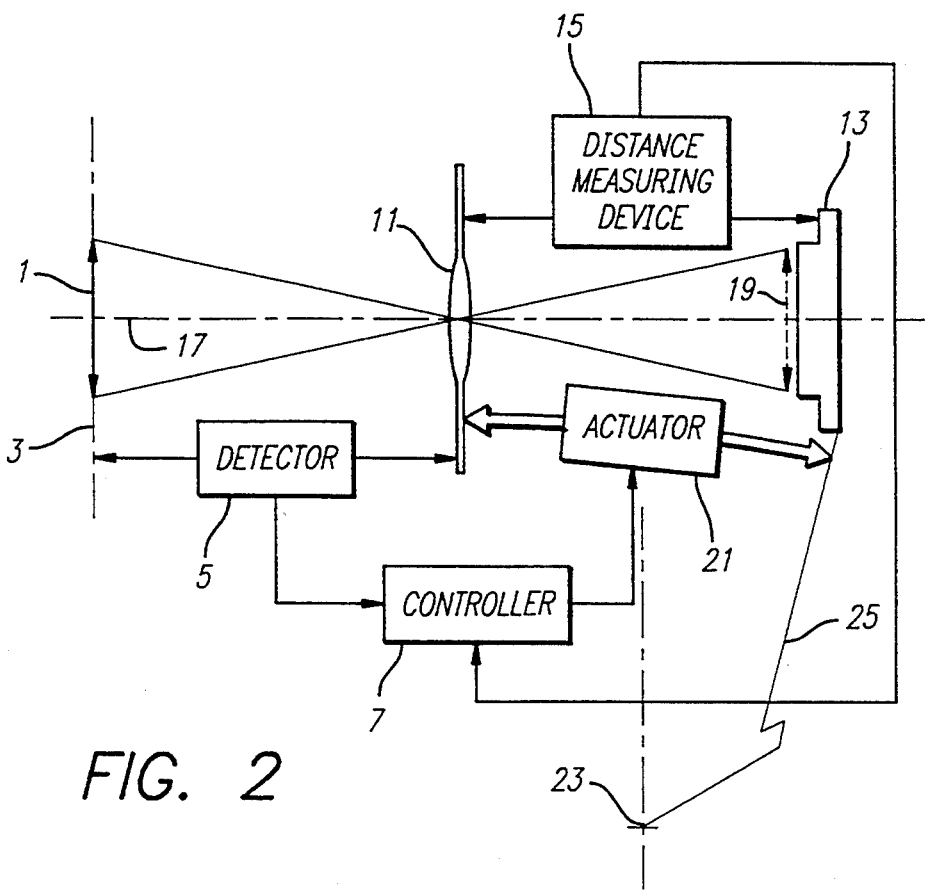
FIG. 2 is a schematic showing the invention where the imager is allowed to rotate about a pivot point located off the optical axis thereby causing the actuator to move the imager along an arc tangential to the optic axis.

Whereas FIG. 1 shows a system for linear movement of the imager, FIG. 2 shows the system where the imager is mounted to rotate about an axis centered at a pivot point 23. The plane of the imager which receives image 19 will be parallel with a radius vector 25 originating from axis of rotation 23. Actuator 21 for this embodiment is a means of causing movement of imager 13 along an arc tangential to optic axis 17 by causing rotation about axis 23. Otherwise, all elements of FIG. 2 correspond with those elements shown in FIG. 1.

In FIG. 2, by proper positioning of lens 11 in relation to the depth of field required for the range of object locations along optical axis 17 and control of the radius of the arc, the length of the arc along the circle of rotation tangential to optical axis 17 can be optimized. Accordingly, the angle of rotation can be held to very small angles. Although some distortion of image 19 can occur, such can be readily taken into account regarding the particular application of this type of system.

For detector 5, a simple device comprising a string of lights installed on one side of object 1 and a parallel string of respective light detectors installed on the other side have been used to detect the height of object 1, i.e., the location of object plane 3. Since object 1 is of the nature that it will block light from being received by some of the detectors depending on the height of object 1, and with these detectors located in a direct relation to the location of lens 11, this device then serves as an appropriate distance measuring device for determining the distance of object 1 from lens assembly 11. Clearly other such of distance measurement devices are available in the prior art. Particularly, such devices are quite common in detecting distance to an object in camera photography applications.

Controller 7 is a microprocessor or computer capable of receiving signal information from detector 5 and device 15, and processing this information to determine a control signal for positioning actuator 9 or 21 for proper location of imager 13 to receive a focused image 19. The processor circuitry for processing the imager position signal receives data concerning the distance between object plane 3 and lens 11 from detector 5, and using data of the imaging properties for lens 11, calculates the location expected for the image plane and produces the drive signal to the actuator required for positioning imager 13 at this image plane.

Figure 3:
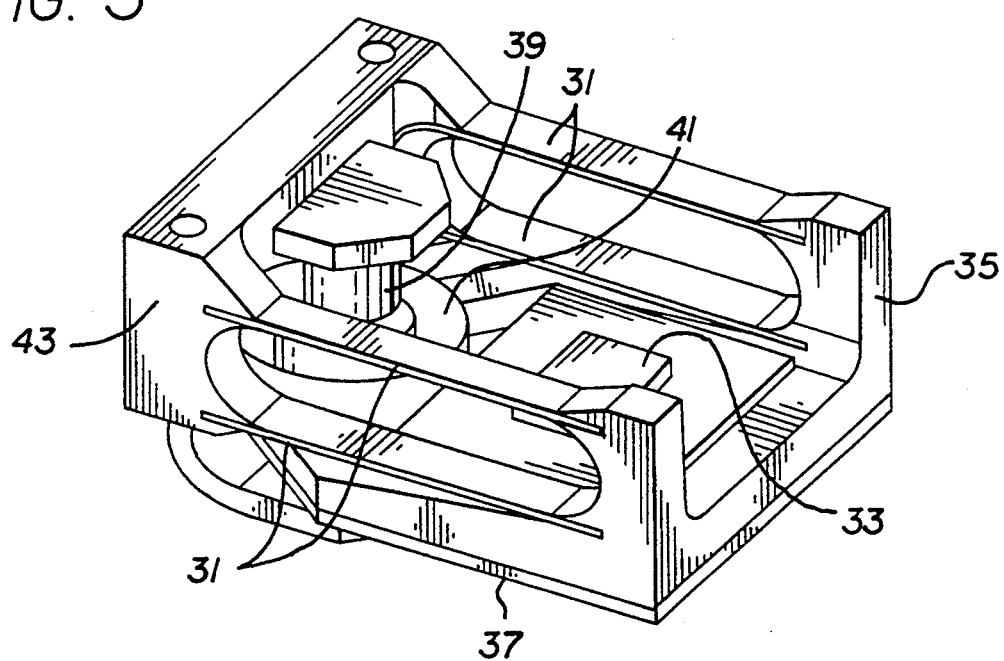
FIG. 3 is a schematic of the imager unit wherein the imager will move in a manner with its image plane perpendicular to the optical axis but through a slight arc movement causing a translation of the image plane from the axis.

FIG. 3 shows an embodiment of the rotary type but with a modified approach which allows the imager to be maintained in a plane perpendicular to the optical axis 17, although allowing the imager to move transversely within this plane. The imager 33 in this embodiment has been shown as two dimensional type imager which can be achieved through the use of transistor arrays capable of detecting the light emanating from object 1. Imager 33 is mounted to an imager frame 35 which also has attached a printed circuit board 37 which contains the electronics for operation of the focusing system. Frame 43 is fixed with lens assembly 11. A motor magnet 39 is fastened to fixed frame 43. A motor coil 41 is fastened to imager frame 35.

Frames 43 and 35 are connected by flexure bars 31. These flexures allow the frames to move relative to one another while maintaining the plane of imager 33 perpendicular to an optic axis positioned through imager 33. The actuator which provides the force for moving frame 35 in relation to fixed frame 43 is the combination of motor magnet 39 and coil 41. By applying an electrical signal to this combination through coil 41, a force is created which will either pull together magnet 39 and coil 41 or force them apart thereby causing imager 33 to translate back and forth along the optical axis.

Figure 4:
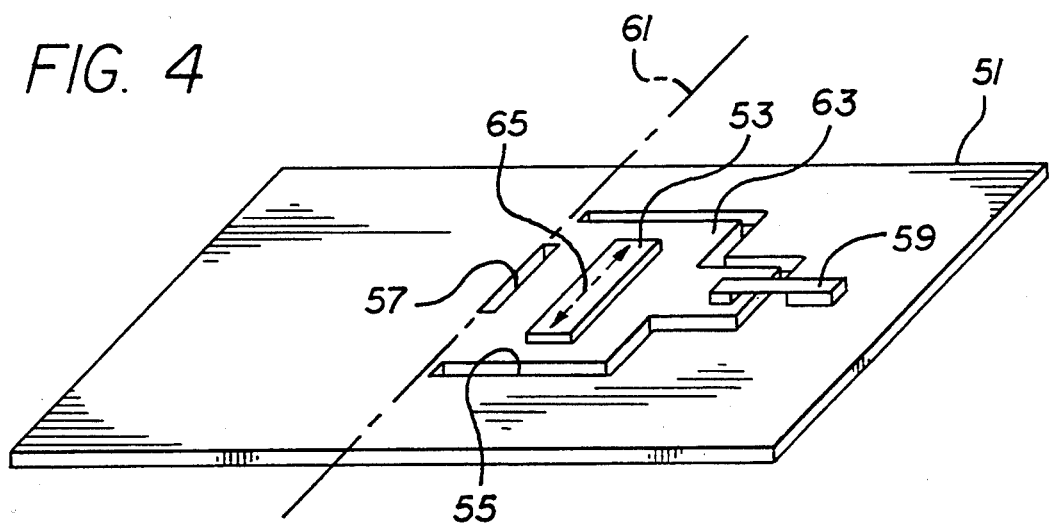
FIG. 4 shows an embodiment of the imager whereby said imager is located on a cantilever portion of a plate which is driven to flex about an axis allowing the imager to change its position along an optical axis.

FIG. 4 presents an embodiment based on the rotating axis technique where the rotating member containing an imager 53 is of a cantilever type which is part of a fixed member 51. Fixed member 51 is a thin plate which can be a printed circuit card which also contains the electronics for the automatic driving circuit. In this manner it can serve as the circuit board for the imager driving electronics including the controller.

A cutout tab 63 is separated from the remainder of plate 51 by a slot 55. Tab 63 cantilevers about axis 61 from the plane of plate 51. Movement of tab 63 is accomplished through an actuator 59 which is attached to plate 51 in a manner to drive tab 63. A slot 57 is constructed through plate 51 along axis 61 in order to minimize any undesired tortional or twisting motion of tab 63 other than about axis 61. This tends to insure that imager 53 will detect image 65 with no distortion along the length of image 65 parallel to axis 61.

As with the other methods actuator 59 may be a linear displacement motor drive system containing a coil and motor magnet. For this embodiment, it is more appropriate to utilize a solid state actuating mechanism such as a piezoelectric driver or another type of electrostrictive or magnetostrictive device for control over movement of tab 63. It should also be clear that imager 53 may be either a linear CCD array or a two dimensional CCD array, or other type optically sensitive array including thin film transistor arrays sensitive to the radiation being detected.

Figure 5:
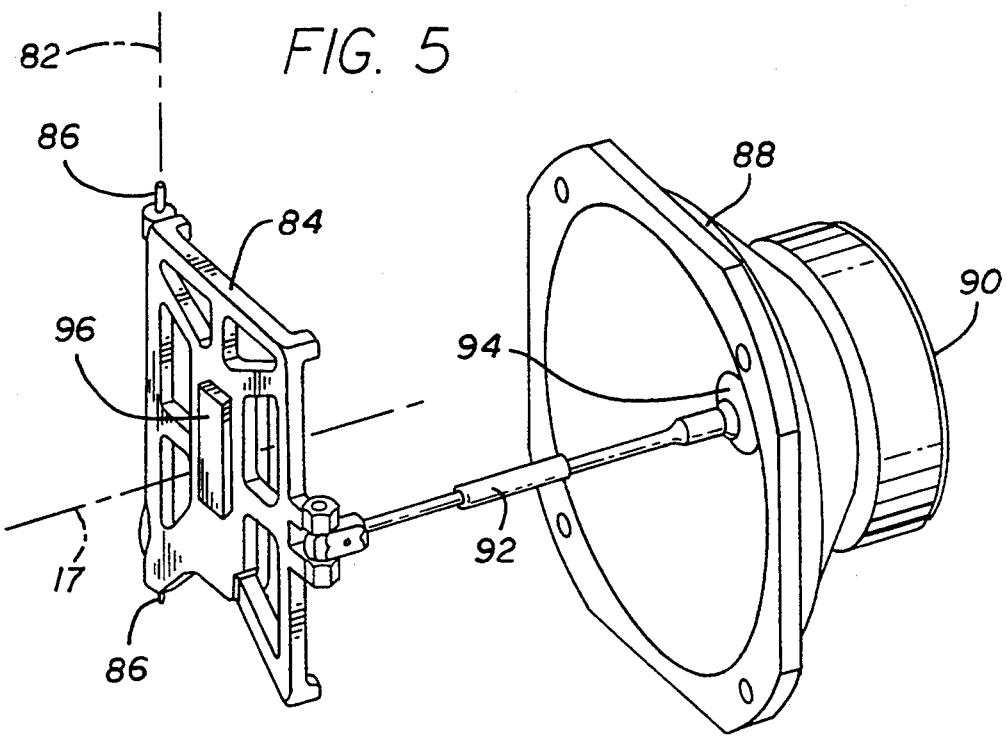
FIG. 5 shows an embodiment where the imager is driven by an ordinary moving coil audio speaker.

FIG. 5 shows a rotating method which utilizes a speaker voice coil to drive imager 96 which will rotate about an axis 82. A lightweight frame 84 which holds imager 96 is pivoted to rotate on axle 86 about the axis of rotation 82. Axle 86 is fastened to brackets on the fixed unit containing the lens assembly (not shown). Imager 96 is oriented to intersect optic axis 17 as described earlier.

A moving coil speaker system 88 containing a magnet assembly 90 and moving coil 94 is utilized to drive connecting rod 92 which is connected to move the imager frame 84. It is to be noted in this figure imager frame 84 has been designed to be very lightweight, thereby according it a low mass and making it more responsive to rapid movements for detection of quickly changing object locations along optic axis 17.

Figure 6:
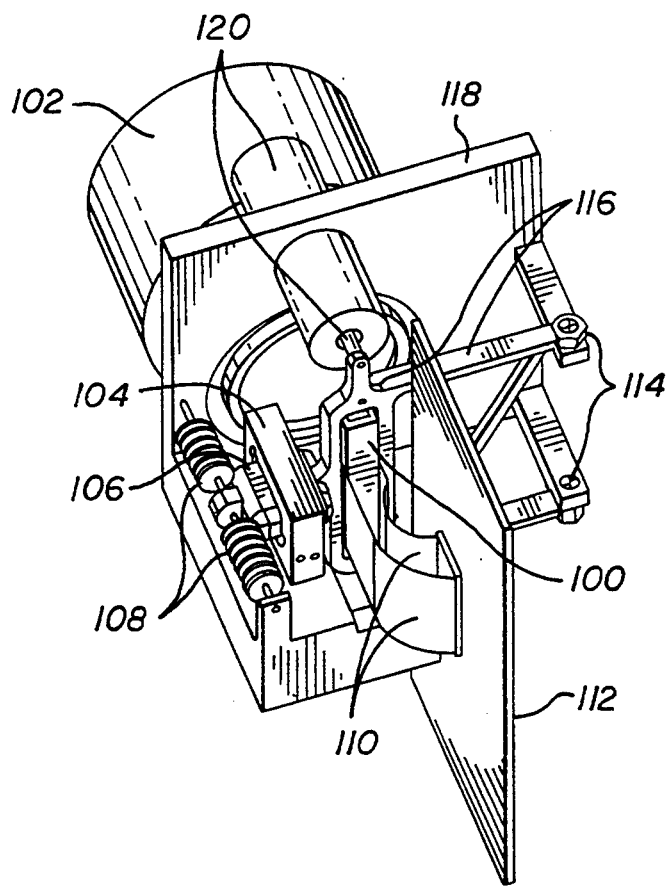
FIG. 6 is a detailed drawing showing the optical system using a pivoting imager.

FIG. 6 shows a complete assembly of an automatic focusing apparatus utilizing a pivoting imager. A lens assembly 102 is fastened to a stationary frame 118 which also holds pivots 114, a stationary circuit board 112, and a stationary motor magnet 104. Resonance or resistance springs 108 are shown connected between stationary frame 118 and pivoting imager frame 116. These resistance or resonance springs are not necessarily needed but may be used to provide a reaction force to movement of the pivoting imager frame thereby making the positioning of imager 100 more positive in action with reduced or no backlash tendencies. Flexural pivots are alternate choices available for reducing any backlash tendencies.

Electrical flex strips 110 are shown connected between imager 100 and stationary circuit board 112 for carrying the signal from the imager 100 to electronics for processing this signal. Stationary circuit board 112 may also contain the controller and provide control signals to the motor coil 106 via flex strips 110 for moving the pivoting imager frame 116.

Imager frame 116 rotates on an axis through pivots 114. Again imager frame 116 has been designed to be extremely light in weight for facilitating rapid reaction to changing image plane locations. Also attached to stationary frame 118 is a linear variable differential transformer 120 which, connected to pivoting imager frame 116 provides a measure of the location of CCD imager 100 in relation to lens assembly 102.

Figure 7:
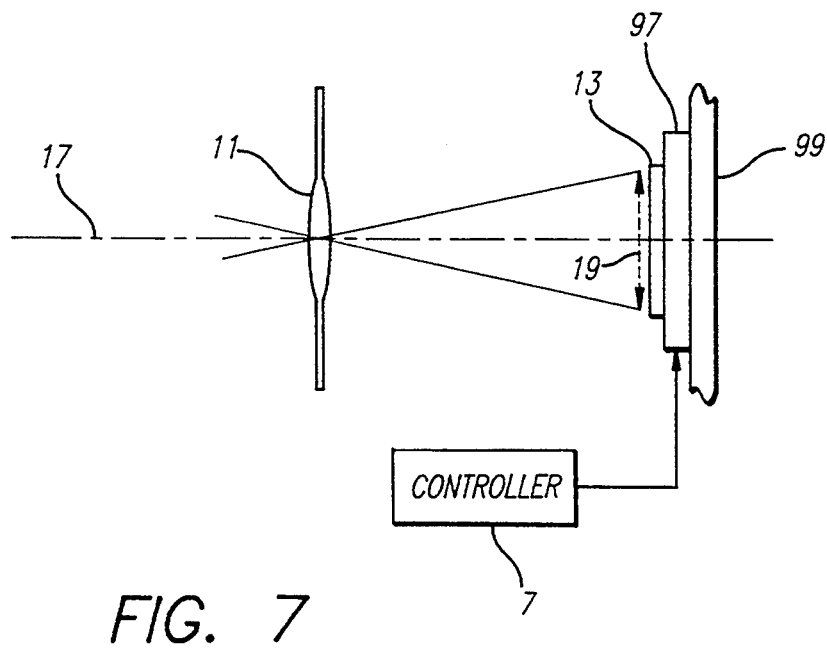
FIG. 7 is a schematic showing use of an electrostrictive element as an actuator.

FIG. 7 shows the use of an electrostrictive or magnetostrictive device for actuating movement of the imager linearly along an optic axis 17. Here imager 13 is shown fastened to piezoelectric device 97 which itself is attached to fixed frame 99 and which also can hold the fixed lens assembly 11. Controller 7 transmits electrical signals to cause electrostrictive deformation of piezoelectric device 97. Piezoelectric device 97 is cut such that the electrostriction deformation is an expansion or contraction along optic axis 17 thereby moving imager 13 back and forth along optic axis 17 in a manner not to cause deformation of image 19. The use of an electrostrictive device such as 97 will generally preclude the need for a distance measuring device 15 for monitoring separation distance between the imager 13 and lens 11, since such devices are stable and repeatable in their operation.

Figure 8:
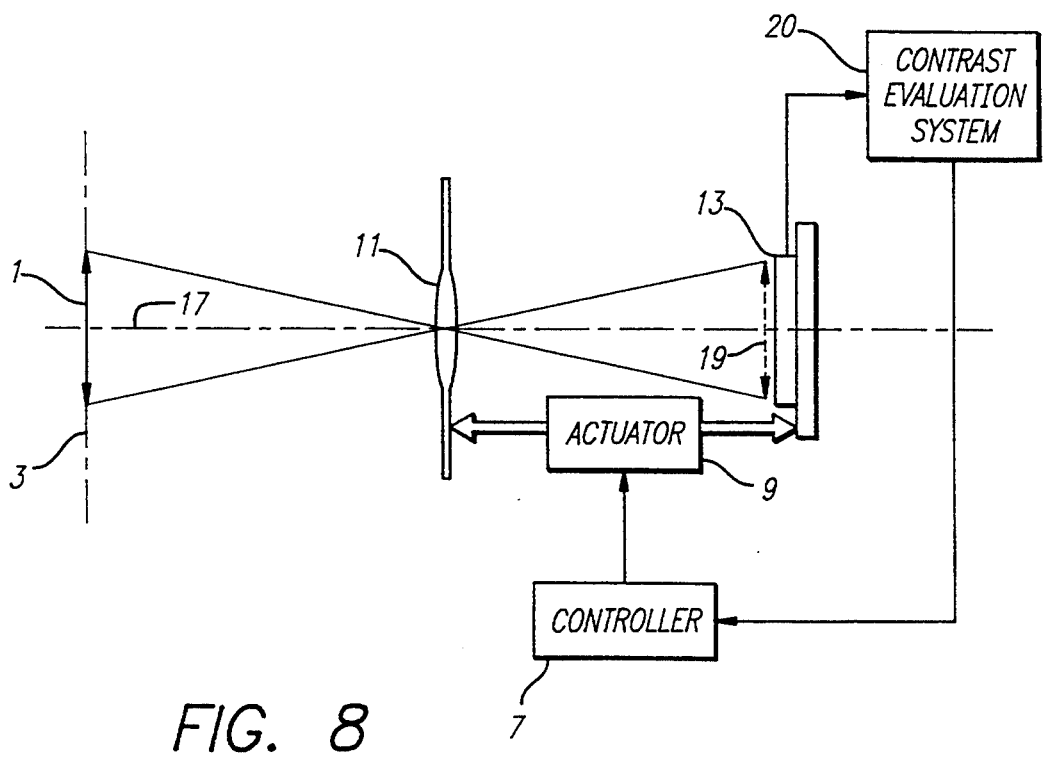
FIG. 8 shows an embodiment where the imager control is determined by through-the-lens evaluation of the image quality.

FIG. 8 shows an alternate technique for determining the control for proper positioning of the imager to receive a focused image. A contrast evaluation system 20 is connected to receive the image as focused through lens 11. Processing algorithms which are well known in the art are used to evaluate the quality of the image to determine if it is in focus. The quality of the image can be related to the image contrast characteristics, its sharpness of detail, or other factors which relate to its degree of focus. Based upon this evaluation, a control signal is developed by controller 7 to activate actuator 9 to reposition imager 13 to the plane of the focused image 19.

Figure 9:
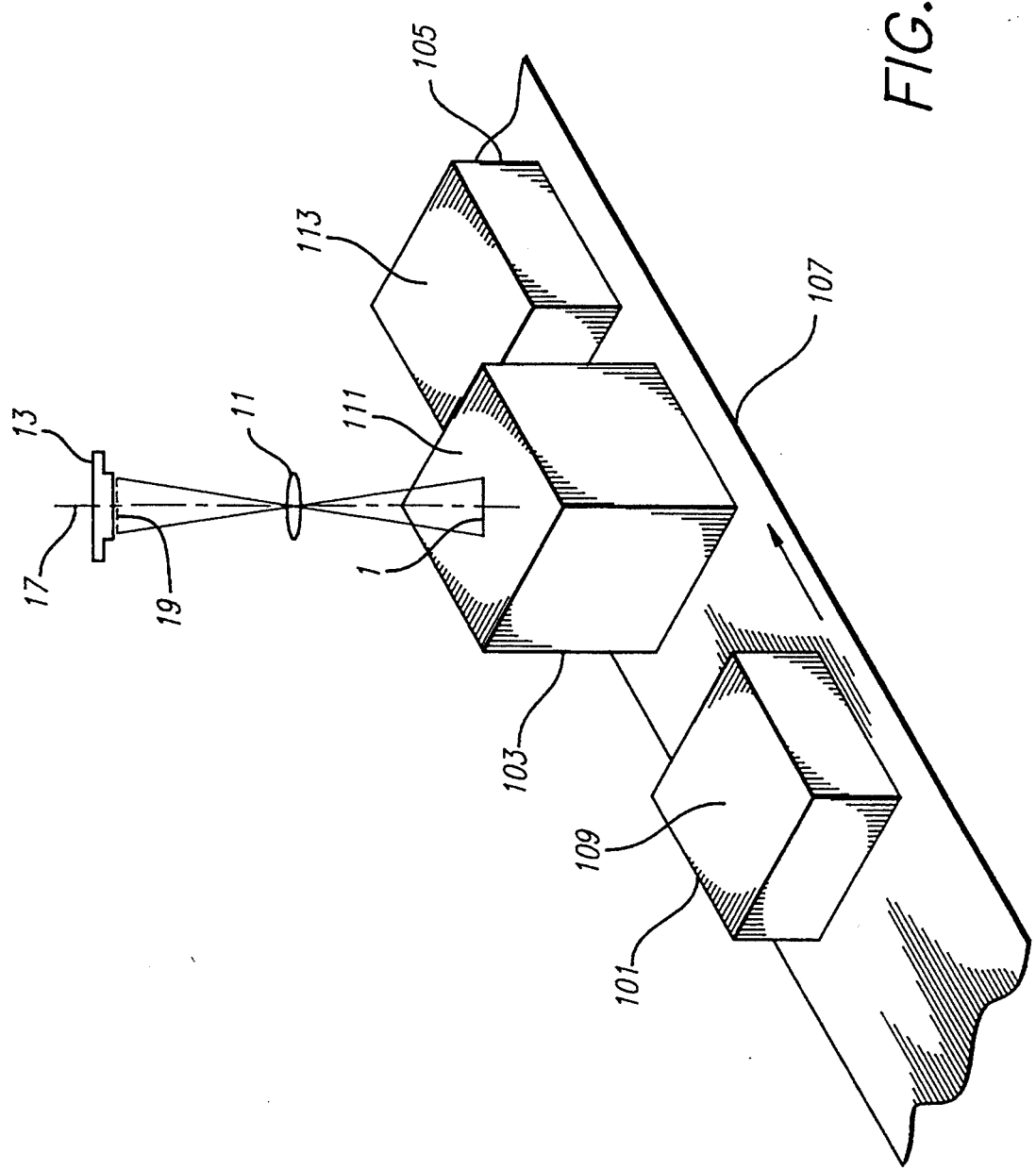
FIG. 9 illustrates application of the invention to use in reading objects carried along a moving conveyor belt system.

The above automatic focusing invention and various concepts are useful in the application of monitoring information on an upper surface of packages traveling at a rapid rate on a conveyor belt. Such use includes reading bar code symbols on mail packages during rapid scanning of a top surface of the mail packages as a conveyor belt moves them past the scanning camera at a rapid rate. Such rate of movement presently can be several hundred feet per minute or faster. FIG. 9 displays such a use. Conveyor belt 107 has placed on it several packages identified as 101, 103 and 105. Each package has a different height in relation to the plane of a conveyor belt 107, and therefore are located at a different distances from lens 11 along optic axis 17.

The object 1, for postal monitoring, is usually a bar code located on the upper surfaces 109, 111 and 113 for the respective packages. Information in these bar code symbols provides directions on handling the mail and otherwise. The bar codes will rapidly change their object 1 position relative to lens 11 as conveyor belt 107 moves past the scanning camera; consequently, the need for the ability to rapidly focus image 19 on imager 13 is quickly appreciated.

While these specific embodiments of the invention herein have been illustrated and described in detail it will be appreciated that the invention is not limited thereto, since many modification may be made by one skilled in the art which fall within the true spirit in scope of the invention.

What is claim is:

1. An apparatus for automatically focusing an image of an object onto an image plane located perpendicular to an optical axis defined by said object and said image plane which comprises:
   (a) a means for focusing said image of said object onto an image plane, said focusing means fixed on the optical axis;
   (b) movable means for detecting said image;
   (c) a means for determining the position of said object along said optical axis and feeding this information to a controller means for determining the location of said image plane:
   (d) means connected to said movable detecting means for controlling the movement of said movable detecting means substantially along said optical axis;
   (e) said controller means for determines the amount of movement control that will be applied to said movable detecting means by said movement controlling means in an open loop fashion.

2. An apparatus according to claim 1 which further comprises a means for measuring the distance between the movable detecting means and the focusing means and connected to transmit this measurement to said controlling means.

3. An apparatus according to claim 2 wherein said means for measuring is a linear variable differential transformer.

4. An apparatus according to claim 2 wherein said means for measuring is a strain gage.

5. An apparatus according to claim 2 wherein said means for measuring is a fiber optic interferometric distance measuring device.

6. An apparatus according to claim 1 wherein said focusing means is a lens system.

7. An apparatus according to claim 1 wherein said focusing means is an optical lens system.

8. An apparatus according to claim 1 wherein said movable means for detecting is an electronic image detecting device.

9. An apparatus according to claim 8 wherein said movable means for detecting is a CCD array.

10. An apparatus according to claim 8 wherein said movable means for detecting is a optically sensitive transistorized array.

11. An apparatus according to claim 1 wherein said movement controlling means is an electromechanical actuator.

12. An apparatus according to claim 11 wherein said actuator is a magnet-coil assembly configured to drive said movable detecting means linearly along the optical axis.

13. An apparatus according to claim 11 wherein said actuator is a motor magnet and coil combination configured to drive said movable detecting means linearly along the optical axis.

14. An apparatus according to claim 11 wherein said actuator is a moving coil audio speaker combination configured to drive said movable detecting means linearly along the optical axis.

15. An apparatus according to claim 11 wherein said actuator is a magnet-coil assembly configured to drive said movable detecting means along an arc tangential to the optical axis.

16. An apparatus according to claim 11 wherein said actuator is a motor magnet and coil combination configured to drive said movable detecting means along an arc tangential to the optical axis.

17. An apparatus according to claim 11 wherein said actuator is a moving coil audio speaker combination configured to drive said movable detecting means along an arc tangential to the optical axis.

18. An apparatus according to claim 11 wherein said actuator is an electrostrictive device to drive said movable detecting means linearly along the optical axis.

19. An apparatus according to claim 11 wherein said actuator is a magnetostrictive device to drive said movable detecting means linearly along the optical axis.

20. An apparatus according to claim 11 wherein said actuator is a piezoelectric transducer device to drive said movable detecting means linearly along the optical axis.

21. An apparatus according to claim 11 wherein said actuator is a electrostrictive device configured to drive said movable detecting means along an arc tangential to the optical axis.

22. An apparatus according to claim 11 wherein said actuator is a magnetostrictive device configured to drive said movable detecting means along an arc tangential to the optical axis.

23. An apparatus according to claim 11 wherein said actuator is a piezoelectric transducer device configured to drive said movable detecting means along an arc tangential to the optical axis.

24. An apparatus according to claim 1 wherein said controller means is a computer.

25. An apparatus according to claim 1 further comprising an image quality analyzer, whereby said analyzer determines the position of said image plane along said optical axis from the evaluation of the quality of the image and sends this information to said controlling means.

26. An apparatus according to claim 25 wherein the image quality analyzer evaluates the degree of focus of the image on the detecting means to determine the location of the image plane for moving said detecting means thereto.

27. An apparatus for automatically focusing an image of an object onto an image plane located perpendicular to an optical axis defined by said object and said image plane which comprises:
   (a) lens assembly fixed on said optical axis;
   (b) an imager movably located on said optical axis;
   (c) an image quality detector, said detector determines the position of said image plane along said optical axis from the evaluation of the quality of the image and sends this information to a electronic controlling circuit;
   (d) an actuator for controllably moving said imager linearly along said optical axis; and
   (e) said electronically controlling circuit connected to operate said actuator to move said imager to said image plane in an open loop fashion.

28. An apparatus according to claim 27 further comprising a distance determining element, said element determines the position of said object along said optical axis and sends this information to said electronic controlling circuit.

29. An apparatus according to claim 27 wherein the image quality detector evaluates the degree of focus of the image on the imager to determine the location of the image plane for moving the imager thereto.

30. An apparatus for automatically focusing an image of an object onto an image plane located perpendicular to an optical axis defined by said object and said image plane which comprises:
   (a) lens assembly fixed on said optical axis;
   (b) an imager movably located on said optical axis;
   (c) an image quality detector, said detector determines the position of said image plane along said optical axis from the evaluation of the quality of the image and sends this information to an electronic controlling circuit;
   (d) an actuator for controllably moving said imager along an arc tangential to said optical axis; and
   (e) said electronically controlling circuit connected to operate said actuator to move said imager to said image plane in an open loop fashion.

31. An apparatus according to claim 30 further comprising a distance determining element, said element determines the position of said object along said optical axis and sends this information to said electronic controlling circuit.

32. An apparatus according to claim 30 wherein the image quality detector evaluates the degree of focus of the image on the imager to determine the location of the image plane for moving the imager thereto.

33. A method for automatically focusing an image of an object onto an image plane located perpendicular to an optical axis defined by said object and said image plane which comprises:
   (a) focusing said image of said object onto an image plane with a focusing means fixed on the optical axis;
   (b) detecting said image with an imager;
   (c) evaluating the degree of focus of the image as detected by the imager;
   (d) calculating the position of the image plane using empirical algorithms previously determined from measurements with the focusing means in an open loop fashion;
   (e) determining the position of said image plane and controllably moving said imager to this image plane along said optical axis where an image of said object is in focus.

34. A method according to claim 33 wherein the step of determining the position of said image plane further includes the steps of:
   (a) determining the distance between the focusing means and the object; and
   (b) calculating the position of the image plane using imaging properties of the focusing means.

35. An apparatus for forming a focused optical image of an object on an imager, the image being focused in an image plane that intersects an optical axis, which comprises:
   (a) a first member with a focusing device held in a fixed position relative to the optical axis:
   (b) a second member, supported for pivotal movement relative to the first member and adapted to hold the imager and movable relative to the first member; and
   (c) an actuator attached to the second member to move the second member relative to the first member in response to a drive signal to position the imager at the image plane.

36. The apparatus of claim 35 wherein the actuator is a speaker driver including a speaker magnet that moves in response to the drive signal and a shaft attached to the speaker magnet to move with the speaker magnet, the speaker magnet being attached to the first member and the shaft being attached to the second member.

37. The apparatus of claim 35 wherein the actuator is a linear motor including a motor magnet and a motor coil, the motor magnet being attached to one of the first or second members and the motor coil being attached to the other of the first or second members.

38. The apparatus of claim 35 wherein the motor magnet is attached to the first member and the motor coil is attached to the second member.

39. The apparatus of claim 35, further comprising:
   (a) sensor circuitry for producing an imager position signal representing the position of the imager along the optical axis; and
   (b) processor circuitry for processing the imager position signal, detecting the difference between the imager position and the location of the image plane along the optical axis, and producing the drive signal based on the detected difference.

40. The apparatus of claim 39 wherein the sensor circuitry includes a linear variable differential transformer.

41. The apparatus of claim 35 wherein the second member is a linearly actuable shaft of a linear motor.

42. The apparatus of claim 35, wherein the focusing device is an optical element for producing the image of the object.

43. The apparatus of claim 42 wherein the optical element is a lens system held stationary relative to the first member.

44. The apparatus of claim 35, further including a device that determines the position of the object along the optical axis and produces the drive signal as representative of the location of the focal plane relative to the position of the object along the optical axis.

45. An apparatus for forming focused optical images of objects at varying distances from the apparatus as they pass by the apparatus along a predetermined path of travel, the apparatus comprising:
(a) a first member held in a fixed position relative to the predetermined path;
(b) an optical element supported by the first member in a fixed position relative to the predetermined path and producing a focused image of one of the objects in an image plane located along an optical axis intersecting the predetermined path;
(c) an imager;
(d) a device that determines the position of the object along the optical axis in an open loop manner and produces a drive signal based upon the location of the image plane relative to the position of the object along the optical axis;
(e) a second member holding the imager and movable relative to the first member to selectively move the imager along the optical axis; and
(f) an actuator attached between the first member and the second member to move the second member relative to the first member in response to said drive signal to position the imager at the image plane.

46. The apparatus of claim 45 wherein the optical element is a lens system.

47. The apparatus of claim 45 which further includes:
(a) sensor circuitry for producing an imager position signal representing the position of the imager along the optical axis; and
(b) processor circuitry for processing the imager position signal, detecting the difference between the imager position and the location of the focal plane along the optical axis, and producing the drive signal based on the detected difference.

48. The apparatus of claim 47 wherein the sensor circuitry includes a linear variable differential transformer.

49. The apparatus of claim 45 wherein the actuator is a linear motor including a motor magnet and a motor coil, the motor magnet being attached to one of the first or second members and the motor coil being attached to the other of the first or second members.

50. The apparatus of claim 45 wherein the actuator is a speaker driver including a speaker magnet that moves in response to the drive signal and a shaft attached to the speaker magnet to move with the speaker magnet, the speaker magnet being attached to the first member and the shaft being attached to the second member.

51. The apparatus of claim 45 wherein the imager is a charge-coupled device.

52. The apparatus of claim 45 wherein the imager is a linear charge-coupled device.

53. The apparatus of claim 45 wherein the imager is a light-sensitive chemical medium.

54. The apparatus of claim 53 wherein the light-sensitive chemical medium is a photographic film.

55. An apparatus for forming focused optical images of objects at varying distances from the apparatus as they pass by the apparatus along a predetermined path of travel, the apparatus comprising:
(a) a first member held in a fixed position relative to the predetermined path;
(b) an optical element supported by the first member in a fixed position relative to the predetermined path and producing a focused image of one of the objects in an image plane located along an optical axis intersecting the predetermined path;
(c) an imager;
(d) a second member holding the imager and movable relative to the first member to selectively move the imager along the optical axis; said second member being supported for pivotal movement relative to the first member; and,
(e) an actuator attached between the first member and the second member to move the second member relative to the first member in response to a drive signal to position the imager at the image plane.

56. An apparatus for forming focused optical images of symbologies appearing on the surfaces of articles located at varying distances from the apparatus, the apparatus comprising:
(a) a conveyor carrying the articles along a predetermined path;
(b) a stationary first member held in a fixed position relative to the predetermined path;
(c) an optical element supported by the first member in a fixed position and producing an image of the symbologies on the surface of one of the articles in an image plane along an optical axis intersecting the predetermined path as the conveyor carries the articles past the optical element;
(d) an imager;
(e) a device that measures the relative position of at least one of said symbologies located on the surface of said one of said articles with respect to the position of said fixed optical element along said optical axis; and, produces a drive signal based upon said relative position of said imager with respect to the position of said surface of said one of said articles along the optical axis;
(f) a second member supporting the imager for travel therewith, the second member being movable relative to the first member to selectively move the imager along the optical axis; and
(g) an actuator attached to move the second member relative to the first member in response to said drive signal indicative of the distance along the optical axis between the position of the imager and the position of the image plane to adjustably position the imager at the image plane.

57. A method for forming a focused optical image of an object on an imager, the image being focused in an image plane that intersects an optical axis, comprising the steps of:
(a) placing a first member supporting a stationary optical element at a fixed position relative to the optical axis;
(b) providing a movable second member holding the imager;
(c) measuring the distance between said object and said stationary optical element along said optical axis; and, generating a drive signal proportional to said measured distance to adjust the relative position of the imager and the image plane along the optical axis in an open loop fashion; and
(d) selectively moving the second member relative to the first member in response to the drive signal to position the imager at the image plane.

58. The method of claim 57 wherein the second member is moved relative to the first member by pivoting the second member about an axis of rotation to move the imager substantially along the optical axis.

59. An apparatus for forming focused optical images of objects at varying distances from the apparatus as they pass by the apparatus along a predetermined path of travel, the apparatus comprising:
- (a) a first member held in a fixed position relative to the predetermined path;
- (b) an optical element supported by the first member in a fixed position relative to the predetermined path and producing a focused image of one of the objects in an image plane located along an optical axis intersecting the predetermined path;
- (c) an imager;
- (d) a second member holding the imager and movable relative to the first member to selectively move the imager along the optical axis; said second member including:
  - (d)(1) a planar bed holding said imager with an imager receiving surface oriented at a predetermined angle to the plane of the bed;
  - (d)(2) at least one first pivot arm pivotally connected to a first edge of said planar bed;
  - (d)(3) at least one second pivot arm pivotally connected to a second opposite edge of said planar bed, said first and second pivot arms having substantially equal lengths;
  - (d)(4) said first pivot arm connected at its end opposite the end connected to the bed to a first pivot point in a plane parallel to the bed and spaced a predetermined distance from said bed; and
  - (d)(5) said second pivot arm connected at its end opposite the end connected to the bed to a second pivot point in said plane parallel to the bed, said distance between said first and second pivot points substantially equal to the distance between the connections of said first and second pivot arms to said bed, whereby the edge of the bed, the line between first and second pivot points, and the first and second pivot arms approximately form a parallelogram and
- (e) an actuator attached between the first member and the second member to move the second member relative to the first member in response to a drive signal to position the imager at the image plane.

60. The apparatus of claim 59 wherein the first and second pivot arms are flexures allowing approximate rotation about the pivot points and points of connection to the bed.

* * * * *